United States Patent [19]

Tillman et al.

[11] Patent Number: 5,035,089

[45] Date of Patent: Jul. 30, 1991

[54] BLAST MEDIA RECOVERY AND CLEANING SYSTEM

[75] Inventors: William R. Tillman; Robert A. Pauli, both of Solano County, Calif.

[73] Assignee: Pauli & Griffin, Vacaville, Calif.

[21] Appl. No.: 471,553

[22] Filed: Jan. 29, 1990

[51] Int. Cl.$^5$ .............................................. B24C 9/00
[52] U.S. Cl. ...................................... 51/425; 51/436; 209/12; 209/19
[58] Field of Search .................. 51/424, 425, 436; 209/466, 467, 486, 487, 490.19, 488.12

[56] References Cited

U.S. PATENT DOCUMENTS

| | | | |
|---|---|---|---|
| 2,935,820 | 5/1960 | Mead | 51/425 |
| 3,444,996 | 5/1969 | Douglas | 209/467 X |
| 3,540,155 | 11/1970 | Walker | 51/424 X |
| 3,734,289 | 5/1973 | Pearman | 209/467 |
| 4,146,466 | 3/1979 | Chapman | 209/490 X |
| 4,387,019 | 6/1983 | Dale | 209/19 X |
| 4,394,256 | 7/1983 | Goff | 51/425 X |
| 4,598,501 | 7/1986 | Vasek | 51/425 |
| 4,646,480 | 3/1987 | Williams | 51/424 |

Primary Examiner—Frederick R. Schmidt
Assistant Examiner—Bruce P. Watson
Attorney, Agent, or Firm—Flehr, Hohbach, Test, Albritton & Herbert

[57] ABSTRACT

A blast media recovery system is provided that recycles reusable blasting media from spent blasting materials. The system includes several different separators which classify the recovered materials by either specific gravity or size. After the materials have been classified by size and the low density materials have been removed, the bulk recycled materials are directed towards a dense particle separator that is arranged to separate any high density materials from the usable blasting media. The dense particle separator includes a frame having a plenum coupled thereto. A porous stone is placed within the plenum and the recycled materials to be cleaned are delivered into the plenum over the top surface of the porous stone. Compressed air is then passed into the plenum through the porous stone to form a fluidized bed. As more material enters the plenum, the lower density materials (i.e. the reusable blasting media) pile over the higher density materials and spill from the plenum into a media chute. The heavier materials retained within the plenum are periodically emptied. The system is arranged to automatically allow continuous recycling of the blasting media.

21 Claims, 3 Drawing Sheets

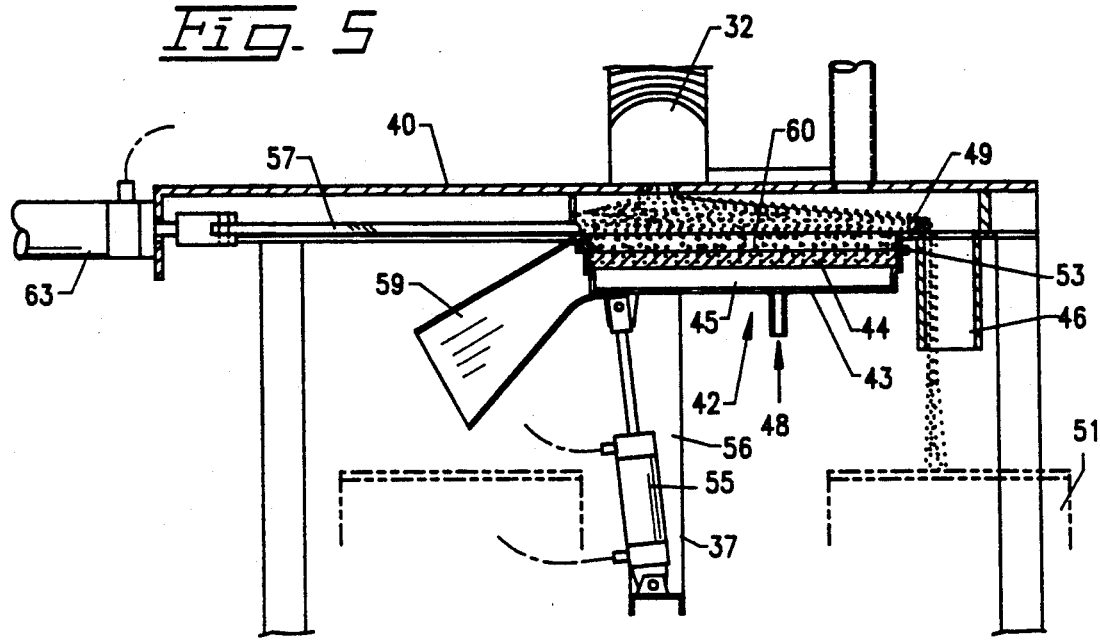
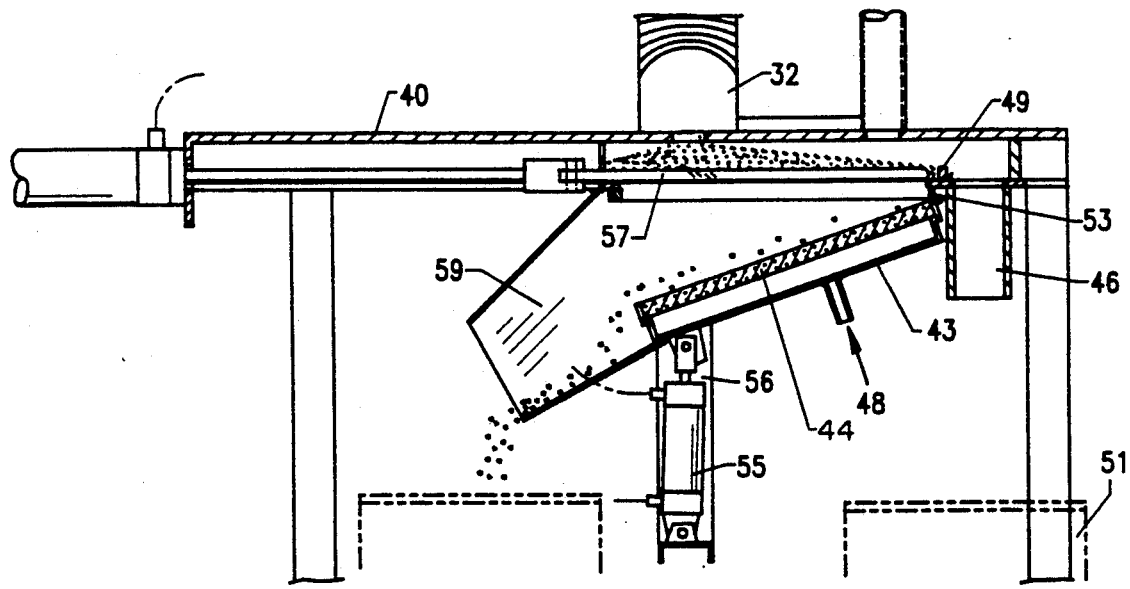

BLAST MEDIA RECOVERY AND CLEANING SYSTEM

The present invention relates generally to a media recovery system for abrasive blasting operations. More particularly, an improved media recycling arrangement is disclosed that automatically recycles and cleans recovered blasting materials.

BACKGROUND OF THE INVENTION

Before an aircraft, automobile or other machinery is repainted, it is generally necessary to remove the old paint. The most efficient way to remove old paint is to blast clean the machinery. Originally, sand was used as the abrasive media in such cleaning operations. However, sand has a drawback in that it typically breaks down during its first use to the extent that it is not generally reusable. Additionally, sand has a relatively high specific gravity and for some blasting operations, such as cleaning aircraft, it can create undesirable stress points in the aircraft frame. Therefore, several artificial abrasive materials have been developed that are reusable. The artificial blasting materials used for cleaning operations are typically fashioned from plastics and are generally somewhat lighter than sand. However, even plastic abrasive materials tend to break down after several uses.

In order to recycle the blasting media, it must be collected and separated from dust and debris that accumulates during blasting. At times it is also necessary to separate heavy particles such as sand, rocks and metal flakes from the blasting media to prevent damage to the machinery being cleaned during blasting operations. This is particularly important when painting aircraft since any metallic flakes, pebbles or the like that are entrained with the media during blasting operations can damage the airframe. Accordingly, there is a need for mechanisms capable of cleaning the recycled blasting materials. In large scale blasting operations such as large aircraft painting facilities, there are extended periods of time during which the blasting materials are used. Accordingly, there is a need for recycling systems capable of operating substantially continuously without requiring extensive maintenance or operator attention.

There are a wide variety of cyclone separators that have been developed to separate the lighter particles such as dust from the recycled blasting media. However, such devices are not particularly well adapted to separating heavier particles from the blasting media or to classify the recycled media by size. Screens can readily be used to classify the blasting materials by size. Specifically, large mesh screens can be used to separate large items, such as masking tape, paper, hardware and the like from the recycled media. Similarly, fine mesh screens can be used to separate the small grained particles (such as broken down blasting media that is unsuitable for reuse) from the good blasting media. However, such screen systems are incapable of classifying the blasting materials by density. Therefore, there is a need for a mechanism capable of continuously cleaning recycled blast media that is capable of classifying the recycled materials by both density and size.

SUMMARY OF THE INVENTION

Accordingly, it is a primary objective of the present invention to provide a blast media separator that is capable of classifying the recycled materials by both density and size.

Another objective is to provide a blast media separator that operates substantially continuously.

Another objective is to provide a dense particle separator that effectively separates heavy (dense) particles from the blasting media.

To achieve the foregoing and other objects and in accordance with the purpose of the present invention, a blast media recovery system is provided that recycles reusable blasting media from spent blasting materials. The system includes several different separators which classify the recovered materials by weight, density or size. A first separator receives the bulk recycled materials and removes a substantial portion of the lighter particles from the spent blasting materials. A second separator having at least a pair of classifying meshes receives the output of the first separator and separates the materials by size into large, medium and small groups. The second separator is arranged such that the medium sized materials include substantially all of the reusable blasting media. Finally, a dense particle separator is arranged to receive the medium sized materials and serves to separate any materials from the usable blasting media that are too dense to be recycled. The materials separated by the dense particle separator are discharged as waste and the usable blasting media is delivered for reuse.

In an independent aspect of the invention, a novel dense particle separator is presented which removes heavy particles from blasting media. The dense particle separator includes a frame having a plenum coupled thereto. The plenum is arranged as a fluidized bed and receives the materials to be classified. As more materials are fed into the plenum, the heavier (more dense) materials fall to the bottom of the fluidized bed and the lighter (less dense) materials (i.e., the reusable blasting media) pile over the heavier materials, spilling from the plenum into a media chute. The plenum is then periodically discharged to remove the heavier materials that accumulate within the plenum.

In a preferred embodiment, the plenum is pivotally movable between an operating position that retains the heavy materials within the plenum and a discharge position which discharges materials within the plenum. A knife carried by the frame is arranged for movement back and forth above the plenum between a position that seals the region above the plenum to a position that leaves the space above the plenum open. When the knife is positioned in the sealed position, the plenum may be dropped to discharged the materials disposed therein without discharging substantial portions of the blasting media.

A controller is provided to selectively move the knife into the sealed position and to selectively move the plenum into the discharge position. The controller only moves the plenum to its discharge position after the knife has been moved into the sealed position. Similarly, the knife is returned to the open position only after the plenum has been returned to its operational position.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 5 is a diagrammatic cut away side view of the dense particle separator shown in FIG. 3 in the operational mode.

FIG. 6 is a diagrammatic cut away side view of the dense particle separator shown in FIG. 3 in the dumping mode with the knife extended.

DETAILED DESCRIPTION OF THE DRAWINGS

Figure 1:
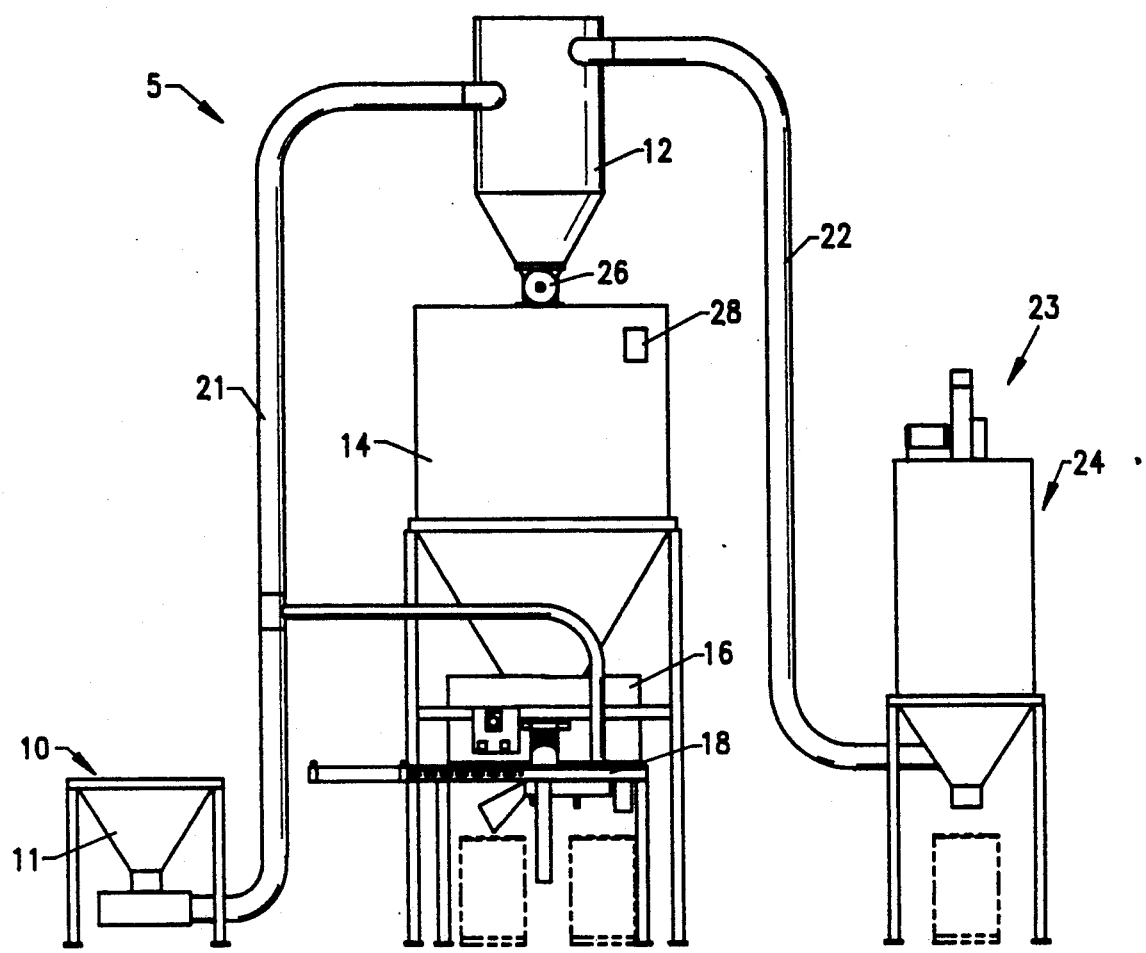
FIG. 1 is a diagrammatic front elevational view of a blast media cleaning system constructed in accordance with the present invention.
Figure 2:
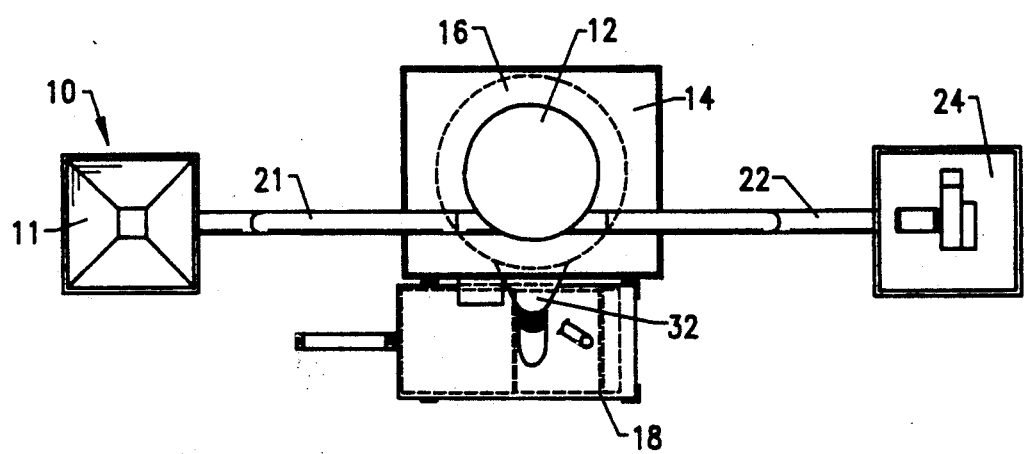
FIG. 2 is a diagrammatic top view of the blast media cleaning system shown in FIG. 1.

As illustrated in the drawings, the embodiment of the blast media recovery and cleaning system 5 described includes an intake 10, a cyclone separator 12, a bulk storage bin 14, a vibratory multiple screen separator 16, and a dense particle separator 18. Referring initially to FIGS. 1 and 2, the spent blasting materials to be recovered and cleaned are poured into intake 10. An intake bin may be provided to receive the bulk materials for recycling and to regulate the rate at which the spent blasting material is delivered to the recovery and cleaning system 5. Alternatively, the intake 10 may be directly attached to a media recovery system.

The bulk recycled material is initially passed from the intake 10 through intake tubing 21 into a standard cyclone separator 12. A dust collector 23 creates a suction suitable for drawing the bulk recycled materials from the intake 10 through the intake tubing 21. The gathered materials pass into the cyclone separator 12 which separates the lightest particles and dust from the bulk recycled material. The fine particles are then sucked through tubing 22 into a fine particle collection bin 24 associated with the dust collector 23. The collected fine materials may then be disposed of in any conventional manner.

The bulk recycled materials discharged from the cyclone separator 12 are passed through an air lock 26 and dumped into bulk storage bin 14 which is positioned directly below the cyclone separator. The bulk storage bin is designed to regulate the delivery of materials to the rest of the system while allowing the dust collector and cyclone separator to operate substantially continuously. However, a level detector 28 is provided in the bulk storage bin to insure that the bulk storage bin is not overloaded. In the event that the bulk storage bin is filled to its capacity, the level detector shuts down the dust collector thereby stopping the introduction of materials into the system.

A feed regulating valve (not shown) controls the flow of the bulk materials from the bulk storage bin 14 into vibratory separator 16. In the described embodiment, the vibratory separator includes a pair of classifying screens having different mesh sizes. The top screen has the largest mesh size and is intended to separate large pieces of trash, such as masking tape, paper, hardware and the like from the recycled media. The materials caught by the first screen are directed into a waste bin (not shown). The second screen has a finer mesh that is used to separate the small sized particles (such as broken down blasting media that is unsuitable for reuse), from the good blasting media. Materials passing through the second screen are also directed to a waste bin (not shown). The materials that pass through the first screen but are caught by the second screen are directed towards the dense particle separator 18 through a feed tube 32. Thus, the vibratory separator 16 classifies the recycled materials by size. To insure that good separation occurs, the vibratory separator shakes the screens during operation. By way of example, a suitable vibratory separator is the GYRA-VIB separator model ME30C666 manufactured by Midwestern Industries of Massillon, Ohio. By way of example, top and bottom screens sizes of 10 mesh and 50 mesh, respectively, are suitable for use with standard plastic basting media having a specific gravity in the range of 1.10 to 1.65.

The recycled materials directed towards the dense particle separator 18 include substantially all of the recyclable blasting materials. However, heavy particles such as chunks of paint or metal, rock, sand or the like will also be included. In some blasting applications, these heavier (denser) particles can damage the machinery being cleaned. Therefore, the dense particle separator 18 is provided to eliminate the heavier particle.

Referring next to FIGS. 3-6, the construction of the dense particle separator 18 will be described. The dense particle separator segregates the heavier materials from blasting media. Throughout this description, the term "heavy materials" will often be used to refer to these separated materials. However, it should be appreciated that the term heavy is used in a relative sense and should be read as referring to the denser materials within the system as opposed to the absolute weight of the materials.

The dense particle separator 18 includes a frame 40 having a plenum 42 having a floor 43 that is pivotally coupled thereto. A porous stone 44 is placed within the plenum and is sized to rest on a small ledge above the plenum floor to leave a slight airspace 45 between the bottom of the plenum and the porous stone. The recycled blasting materials are delivered from the vibratory separator 16 onto a fluidized bed created within the plenum through a feed chute 32 that opens into the top surface of the frame 40 over the plenum. Thus, the blasting materials are poured over the top surface of the porous stone. Compressed air is fed into the airspace 45 through an air intake 48. The pressurized air passes through the porous stone 44 and then flows through the materials within the plenum thereby agitating and suspending the blasting materials. The agitation causes the materials to behave much like a liquid and thus, the denser materials fall to the bottom of the fluidized bed thereby classifying the agitated materials by specific gravity. As more material enter the plenum, the lighter materials (i.e. the reusable blasting media) pile over the higher density materials and spill from the plenum through a media chute 46 positioned adjacent the plenum. A dam 49 separates the plenum from the media chute to retain the desired depth within the plenum. It should be appreciated that the height of the dam 49 will depend to a certain extent on the nature and densities of the materials being separated. The dam could also be readily eliminated by merely using the walls of the plenum to accomplish the same purpose. The reusable blasting media that spills over the dam into the media chute is then directed to a collection drum or bin 51 which stores the blasting media until its reuse. Alternatively, the media chute could feed the recycled materials directly into a blasting machine.

It should be appreciated that the heavier materials introduced into the dense particle separator will tend to accumulate within the plenum. Therefore, the plenum must be periodically emptied to eliminate the accumulated heavy materials. To facilitate this cleaning, the plenum floor 43 is pivotally mounted to the frame 40 by a hinge 53 which is located adjacent the dam 49. A selectively operable telescopic discharge cylinder 55 is coupled between the end of the plenum 42 opposite the hinge 53 and a leg 56 extending downward from the frame. The discharge cylinder 55 pivotally rotates the plenum 42 between an operating position that retains the heavy materials within the plenum (as seen in FIG. 5) and a discharge position which discharges materials from the plenum (as seen in FIG. 6).

A knife 57 carried by the frame 40 is arranged for movement back and forth above the plenum between a position that seals the region above the plenum to an operational position that is clear of the plenum. The seal may be accomplished by abutting the knife against dam 49 or by passing it closely over all of the plenum's walls. The knife is supported by a track (not shown) which extends across the centerline of the frame. A second telescopic cylinder 63 is provided to push the knife back and forth between the sealed and open positions. During normal operation, the knife is held in the open position free from interfering with the flow of materials into the plenum 42 (as seen in FIG. 5).

Figure 3:
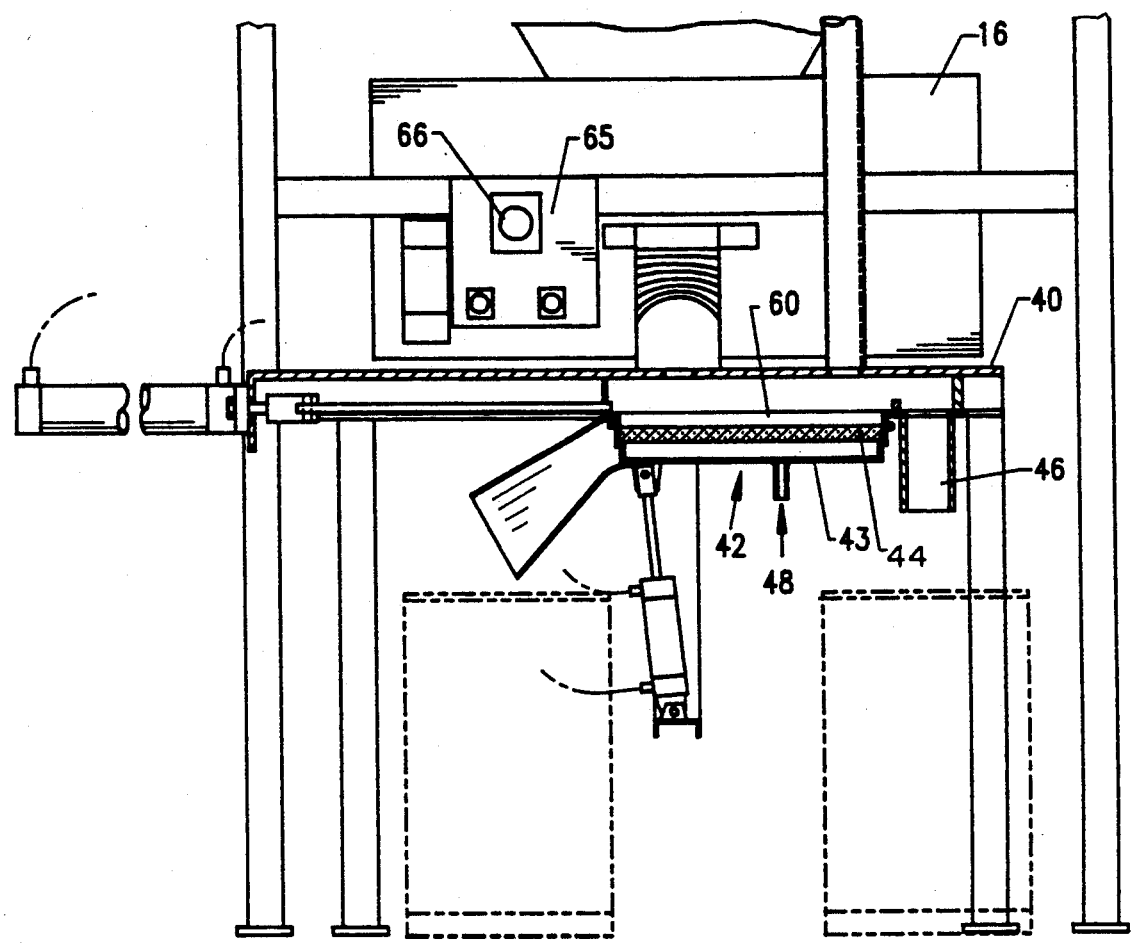
FIG. 3 is a diagrammatic side elevational view of the dense particle separator used in the system shown in FIGS. 1 and 2.
Figure 4:
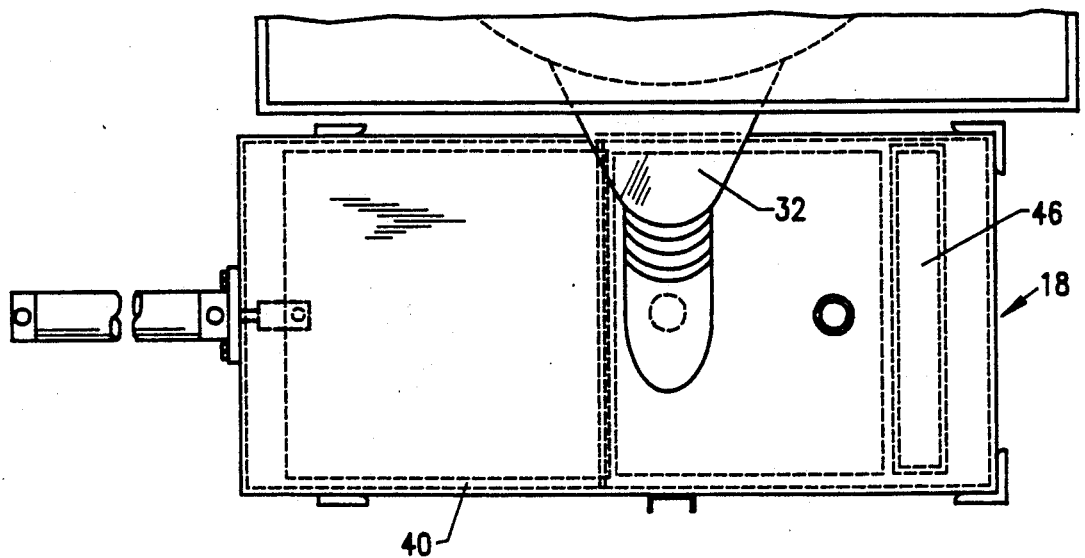
FIG. 4 is a diagrammatic top view of the dense particle separator shown in FIG. 3.

In order to discharge the heavy materials accumulated within the plenum, telescopic cylinder 63 is activated to egress the knife 57 to its sealed position. The knife may be arranged to abut against the dam 49 when it is extended into the seal position or to closely pass over the side walls of the plenum. The knife is mounted in a plane that extends a spaced apart distance above the porous store 44 to leave a space 60 therebetween. FIGS. 3 and 5. The actual spacing may be varied somewhat but is arranged to insure that substantially all of the higher density materials separated by the fluidized bed will be retained within the plenum after the knife has been egressed to the sealed position. Once the plenum is sealed, the discharge cylinder 55 is activated thereby pivoting the plenum about the hinge 53. Any materials trapped between the porous store 44 and the knife 57 are then dropped through discharge chute 59 into a waste barrel 61. The discharge chute 59 is formed from a flexible material such as leather so that when the plenum is lifted back to the operational position the discharge chute folds out of the way. As seen in FIGS. 5 and 6, the top portion of the discharge chute 59 is attached to the frame and the lower portion of the discharge chute is secured to the bottom side of plenum floor 43. It also wraps around the outer sides of the plenum 42 sufficiently to prevent the discharge materials from spilling away from waste barrel 61.

During operation, the materials collected within space 60 in plenum 42 will be emptied at preselected intervals. The actual length of time between discharges will depend on such factors as the bulk material flowrate, the size of the plenum and the cleanliness of the recycled materials. Since no attempt is made to monitor the accumulation of the high density materials within the plenum, the discharge cycle should be selected so that the space 60 between the knife 57 and the porous stone 44 will be only partially filled with heavy materials when that volume is emptied. This is for two reasons. Initially, it should be apparent that if that space is allowed to accumulate too much of the high density material, it will begin to overflow into the media chute 46 defeating the purpose of the dense particle separator. Therefore, the space between the knife and porous stone is arranged such that each time the plenum is discharged a certain amount of the media will be caught under the knife and discharged to waste bin 62 with the heavy waste materials. However, since the knife retains most of the media above the plenum the cleaning cycle is accomplished without discharging substantial portions of the blasting media.

The actual timing between the cycles may be widely varied. By way of example, a suitable discharge cycle for a dense particle separator having a quarter inch space between the porous stone and the knife blade, an input flowrate on the order of 40 pounds per minute and a surface area of approximately 132 square inches is on the order of one discharge each three minutes.

A controller 65 is provided to actuate the pneumatic cylinders 55, 63 and to stop the flow of bulk materials into the dense particle separator during the discharge cycle. A hand set timer 66 allows the user to select the time between discharge cycles. When the timing cycle has elapsed, the controller shuts off air to the fluidizing bed which regulates the flow of materials out of the fluidized bed and actuates telescopic cylinder 63 to move the knife into the sealed position. A limit switch (not shown) detects when the knife has been fully egressed and so informs the controller 65. Once the knife is in place, the discharge cylinder 55 is activated to pivot the plenum into the discharge position. The controller only activates the discharge cylinder 55 after the knife has been fully moved into the sealed position. A second limit switch verifies that the plenum is fully dropped to the discharge position. The plenum is held in the discharge position for a timed interval during which time air to the fluidizing bed is reactivated to clean the bed face of all particles. The discharge cylinder is then reactivated to return the plenum to its operational position. Once, the plenum is returned to the operational position (as verified by another limit switch), the knife is returned to its withdrawn position, the timer 66 is reset and the air to the fluidizing bed is turned on to induce classification.

A limit switch is also provided to detect when the knife has been pulled into its withdrawn position clear of the plenum. The entire discharge cycle is then repeated upon the expiration of the time period selected on the timer 66.

The described system is capable of continuously recycling spent blasting materials without requiring operator assistance. The bulk storage bin provides a good buffer to handle transient supply surges. The bulk feed materials are classified by both size and density to insure that only reusable blasting materials are recycled. Importantly, the density classification includes separating high density particles such as metal flakes and paint chips from the blasting materials.

Although only one embodiment of the present invention has been described herein, it should be understood that the invention may be embodied in many other specific forms without departing from the spirit or scope of the invention. For example the pivotal plenum structure described can readily be modified to other discharge systems without detracting from the invention's utility. Particularly, it should be appreciated that the actual components used to remove the lighter, smaller and larger materials from the bulk recycled materials may be widely varied without departing from the dense particle recovery aspect of the invention. Similarly, the actual components of the dense particle separator may be widely varied without departing from the spirit or scope of the present invention. For example, the pivotal plenum structure described can readily be modified to utilize other discharge mechanisms without detracting from the invention's utility. Therefore, the present examples and embodiments are to be considered as illustrative and not restrictive, and the invention is not to be limited to the details given herein, but may be modified within the scope of the appended claims.

We claim:

1. A dense particle separator for cleaning dense particles from blasting media, the dense particle separator comprising:
   a frame;
   a plenum coupled to the frame;
   a media chute opening into a region above the plenum for carrying cleaned blasting materials away from the plenum;
   a porous stone disposed within the plenum, the porous stone having top and bottom surfaces;
   means for delivering materials to be separated into the plenum over the top surface of the porous stone;
   air delivery means for delivering compressed air to the plenum and arranged to pass the air upward through the porous stone, wherein in operation, air passing through the porous stone flows through the materials within the plenum thereby agitating the materials and classifying the agitated materials by specific gravity, the higher density materials falling towards the bottom of the plenum over the porous stone and the lower density materials piling over the denser materials and spilling over the plenum into the media chute;
   means for moving the plenum between a shut position that retains the denser materials within the plenum and a discharge position which discharges materials within the plenum; and
   a knife carried by the frame and arranged for movement back and forth above the plenum between a position that seals above the plenum to a position that leaves the space above the plenum open, wherein when the knife is positioned in the sealed position, the plenum may be dropped to discharge the materials disposed therein without discharging substantial portions of the blasting media.

2. A dense particle separator as recited in claim 1 further comprising control means selectively moving the knife into the sealed position and for selectively moving the plenum into the discharge position, wherein the plenum is only moved into the discharge position after the knife has been moved into the sealed position and wherein the knife is returned to the open position only after the plenum has been returned to the shut position.

3. A dense particle separator as recited in claim 2 further comprising a dam carried by the frame for blocking the passage between the region above the plenum and the media chute for regulating the height of the materials within the plenum.

4. A dense particle separator as recited in claim 2 further comprising egress means for selectively causing the knife to move from the sealed position and the open position.

5. A dense particle separator as recited in claim 4 wherein the egress means includes:
   a track on which the knife may travel back and forth;
   a selectively operable telescopic cylinder for pushing the knife forward or backward along the track; and
   a knife guide carried by the frame for guiding the knife's travel back and forth over the plenum.

6. A dense particle separator as recited in claim 2 wherein said plenum is pivotally coupled to the frame and said moving means pivots the plenum between said shut and discharge positions, the dense particle separator further comprising:
   a hinge for pivotally coupling the plenum to the frame; and
   a selectively operable telescopic discharge cylinder coupled to the frame on the first end and to the plenum on a second end for pivotally moving the plenum between the shut and discharge positions.

7. A dense particle separator as recited in claim 6 further comprising a discharge chute that cooperates with the plenum to direct the discharged materials away from the dense particle separator.

8. A dense particle separator for cleaning heavy particles from blasting media, the dense particles separator comprising:
   a chamber for receiving bulk recycling materials;
   means for delivering the bulk recycling materials to be separated to the chamber;
   a fluidized bed incorporated into the chamber;
   air delivery means for delivering compressed air to the fluidized bed and arranged to pass the air upward through the bulk recycling materials to classify the agitated materials by specific gravity, the higher density materials falling towards the bottom of the chamber and the lower density materials piling over the denser materials and spilling out of the chamber into a media collection means;
   means for periodically discharging the materials collected within the chamber to a trash collection means;
   a frame for supporting the chamber;
   means for moving the chamber between a sealed position that retains the heavy materials within the chamber and a discharge position which discharges materials within the chamber to the trash collection means; and
   a knife carried by the frame and arranged for movement back and forth above the chamber to a withdrawn position that leaves the space above the chamber open, wherein when the knife is positioned in the sealed position, the chamber may be moved to the discharge position to discharge the materials disposed therein without discharging substantial portions of the blasting media.

9. A dense particle separator as recited in claim 8 further comprising control means for selectively moving the knife into the sealed position and for selectively moving the chamber into the discharge position, wherein the chamber is only moved into the discharge position after the knife has been moved into the sealed position and wherein the knife is returned to the open position only after the chamber has been returned to the shut position.

10. A method of recovering recyclable plastic blasting media from bulk spent blasting materials, the method comprising the steps of:
    passing said bulk spent blasting materials through a first separator to remove a substantial portion of the lighter particles from said spent blasting materials;

passing said bulk spent blasting materials through a second separator that separates the materials passing therethrough by size into large, medium and small groups, wherein the medium sized materials include substantially all of the recyclable plastic blasting media; and passing the medium sized materials into a dense particle separator to separate any non-reusable high density materials from said recyclable plastic blasting media, wherein said non-reusable high density materials are discharged from the dense particle separator and said recyclable plastic blasting media is delivered for reuse.

11. A method as recited in claim 10 wherein said small and large sized materials isolated by the second separator are discharged as waste.

12. A method as recited in claim 11 wherein said less dense materials isolated by said first separator and said denser materials isolated by said dense particle separator are discharge as waste.

13. A method as recited in claim 12 wherein said waste materials are automatically discharged from the system and the system is capable of substantially continuous operation without requiring an operator to remove waste materials from any of the separators.

14. A blast media recovery system for recycling reusable plastic blasting media from bulk spent blasting materials, the system comprising:

a first separator for remove a substantial portion of lighter particles from said spent blasting materials;

a second separator for classifying the materials passing therethrough by size into a plurality of classes, wherein a selected one of the classes includes substantially all of said reusable plastic blasting media; and a dense particle separator coupled to said second separator for receiving said selected materials, said dense particles separator being arranged to separate any high density materials from the desirable reusable plastic blasting media, wherein said high density materials are discharged from said dense particle separator and said reusable plastic blasting media is delivered for reuse.

15. A blast media recovering and cleaning system as recited in claim 14 further comprising:

a bulk storage tank for receiving said spent blasting materials exiting said first separator; and a flow controller for monitoring the delivery of said spent blasting materials from said bulk storage tank to the second separator.

16. A blast media recovering and cleaning system as recited in claim 15 wherein said first separator is a cyclone separator, the system further comprising an air lock disposed between said cyclone separator and said bulk storage tank.

17. A blast media recovering and cleaning system as recited in claim 16 wherein said second separator is a vibratory separator.

18. A blast media recovering and cleaning system as recited in claim 14 wherein said dense particle separator comprises:

a chamber for receiving said selected materials;

air delivery means for delivering compressed air to said chamber and arranged to pass the air upward through said selected materials to agitate said selected materials to classify the agitated materials by specific gravity, the non-reusable materials having higher specific gravities falling towards the bottom of the chamber and the reusable plastic blasting material having lower specific gravities piling over the higher density materials and spilling out of the chamber into a media collection means; and means for periodically discharging the non-reusable materials collected within the chamber to a trash collection means.

19. A blast media recovery system for recycling reusable plastic blasting media from bulk spent blasting materials, the system comprising:

a first separator for removing a substantial portion of lighter particles from said spent blasting materials, such first separator being a cyclone separator;

a second separator for classifying the materials passing therethrough by size into a plurality of classes, wherein a selected one of the classes includes substantially all of said reusable plastic blasting media;

a dense particle separator coupled to said second separator for receiving said selected materials, said dense particle separator being arranged to separate any high density materials from the desirable reusable plastic blasting media, wherein said high density materials are discharged from said dense particle separator and said reusable plastic blasting media is delivered for reuse;

a bulk storage tank for receiving said spent blasting materials exiting said first separator;

a flow controller for monitoring the delivery of said spent blasting materials from said bulk storage tank to the second separator;

an air lock disposed between said cyclone separator and said bulk storage tank; and a level detector mounted on said bulk storage tank for monitoring the level of spent blasting materials within said bulk storage tank, wherein when said level detector determines that the spent blasting material within said bulk storage tank exceeds a designated level, a signal is sent to shut down the supply of materials to said cyclone separator.

20. A blast media recovery and cleaning system for recycling reusable blasting media from spent blasting materials, the system comprising:

a first separator for removing a substantial portion of the lighter particles from the spent blasting materials;

a second separator, for classifying the materials passage therethrough by size into a plurality of classes, wherein a selected one of the classes includes substantially all of the reusable blasting media;

a dense particle separator coupled to the second separator for receiving the selected materials, the dense particle separator being arranged to separate any high density materials from the desirable cleaned blasting media, wherein the high density materials are discharged from the dense particle separator and the cleaned blasting media is delivered for reuse comprising;

a chamber for receiving the selected materials;

air delivery means for delivering compressed air to the chamber and arranged to pass the air upward through the selected materials to agitate the selected materials to classify the agitated materials by specific gravity, the materials having higher specific gravities falling towards the bottom of the chamber and the materials having lower specific gravities piling over the higher density materials and spilling out of the chamber into a media collection means;

means for periodically discharging the materials collected within the chamber to a trash collection means;

a frame for supporting the chamber;

means for moving the chamber between a sealed position that retains the high density materials within the chamber and a discharge position which discharges materials within the chamber to the trash collection means;

a knife carried by the frame and arranged for movement above the chamber between a sealed position that seals above the chamber to a withdrawn position that leaves the space above the chamber open, wherein when the knife is positioned in the sealed position, the chamber may be moved to the discharge position without discharging substantial portions of the reusable blasting media; and control means for selectively moving the knife into the sealed position and for selectively moving the chamber into the discharge position, wherein the chamber is only moved into the discharge position after the knife has been moved into the sealed position and wherein the knife is returned to the open position only after the chamber has been returned to the sealed position.

21. A continuously operable blast media recovery and cleaning system for automatically recycling reusable plastic blasting media from spent blasting materials without requiring the assistance of an operator, the system comprising:

a first separator for removing a substantial portion of the lighter particles from said spent blasting materials;

intake mean for continuously delivering spent blasting media to said first separator;

a second separator for separating the materials passing therethrough by size into large, medium and small groups, wherein the medium sized materials include substantially all of said reusable plastic blasting media; and a dense particle separator coupled to the second separator for receiving said medium sized materials, said dense particle separator being arranged to separate any high density materials from said reusable plastic blasting media, wherein said high density materials are discharged from said dense particle separator and said reusable plastic blasting media is delivered for reuse.

* * * * *